UNITED STATES PATENT OFFICE.

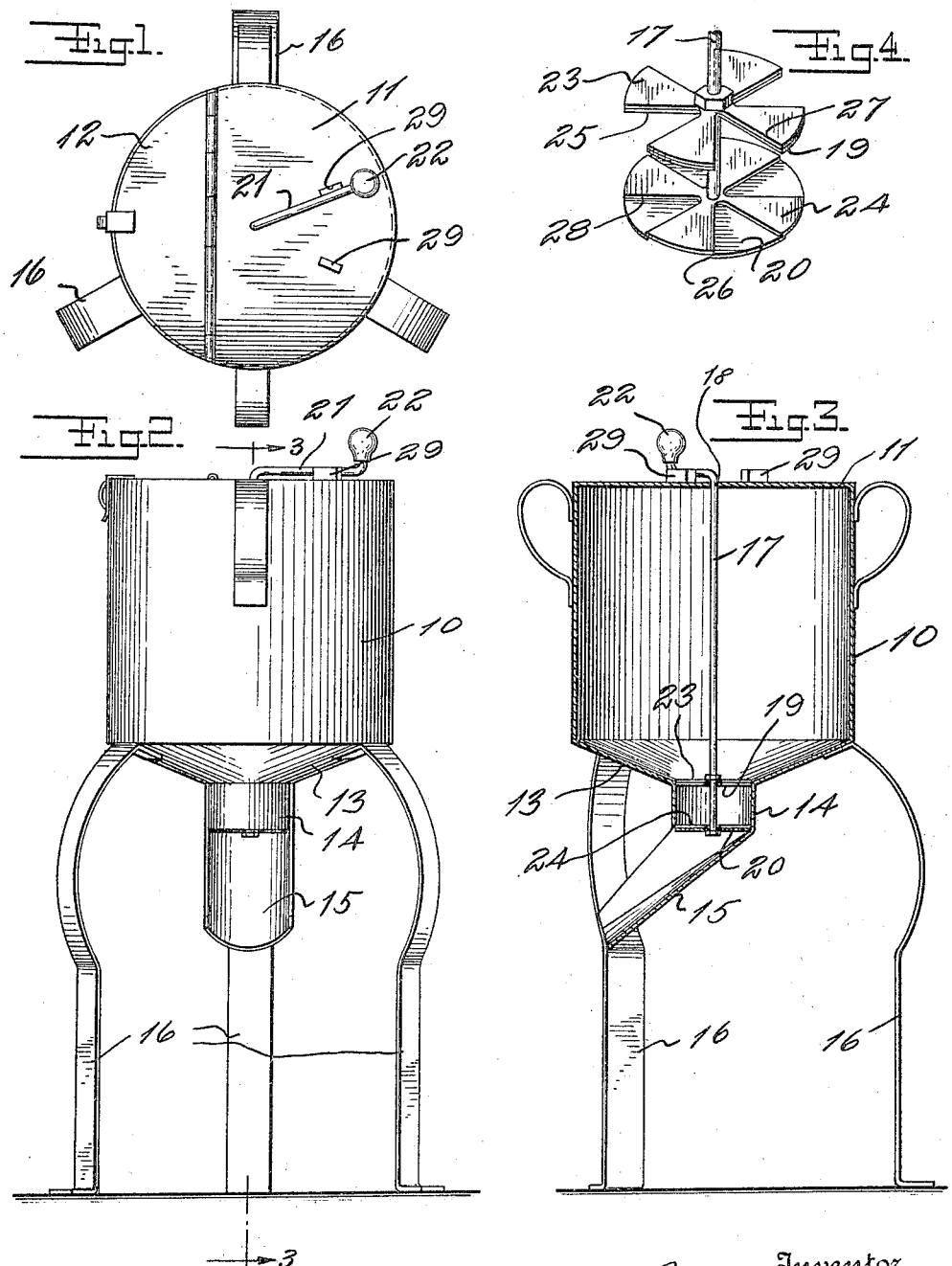

WLADYSLAW MALUSZ, OF HARRISON, NEW JERSEY.

SUGAR-DISPENSER.

1,400,757. Specification of Letters Patent. Patented Dec. 20, 1921.

Application filed May 25, 1921. Serial No. 472,521.

*To all whom it may concern:*

Be it known that I, WLADYSLAW MALUSZ, a citizen of Poland, residing at Harrison, in the county of Hudson and State of New Jersey, have invented certain new and useful Improvements in Sugar-Dispensers, of which the following is a specification.

This invention relates to improvements in dispensing apparatus and more particularly to that type of apparatus for use in restaurants and the like for holding and dispensing sugar or other granular substances.

The principal object of the invention resides in the provision of a device from which a predetermined quantity of the contents of the device may be discharged upon each operation.

Another object of the invention is to provide a device which may be easily and cheaply made from sheet material.

With these and other objects in view the invention consists in the novel construction, combination and arrangement of parts which will be fully set forth in the following specification, claimed and illustrated in the accompanying drawing, in which, Figure 1 is a top plan view of the device,
Fig. 2 is a front elevation of Fig. 1,
Fig. 3 is a vertical sectional view taken on line 3—3 of Fig. 2, and
Fig. 4 is a detail perspective view of the measuring mechanism.

Referring to the drawings in detail the numeral 10 designates the main reservoir comprising a hollow cylindrical body provided with a cover 11 having a hinged section 12 to provide a filling opening for an obvious purpose. The lower end of the reservoir is closed by a funnel shaped bottom wall 13 having a centrally arranged discharge spout 14 the lower end of which opens into a chute 15. The body 10 is supported upon suitable legs 16 which are arranged to give the device the desired elevation to permit a cap or similar vessel to be placed beneath the lower end of the chute so that the material flowing down said chute will be discharged into the vessel.

In order to limit the quantity of material to be discharged, a rod 17 extends through a central opening 18 in the cover 11 and is projected through plates 19 and 20 secured at opposite ends of the spout 14. The upper end of the rod is bent at right angles, to provide a crank arm 21 to the outer end of which a handle 22 is secured.

Secured to the shaft in spaced relation and in such position as to engage the upper faces of the plates 19 and 20 are coöperating shutter plates 23 and 24 respectively. Extending inwardly from the periphery of each of said plates 19 and 20, and 23 and 24 are V shaped notches 25, 26, 27 and 28 respectively and it will be noted that the notches 25 and 26 are arranged in staggered relation, while the notches 27 and 28 are likewise staggered. Thus it will be seen that when the notches 25 register with notches 27, the plate 24 will be turned so as to close the notches 28 and prevent the flow of material from the discharge spout, and as soon as the plate 23 is turned to close the notches 25 in plate 19, the notches 26 in the plate 20 will register with the notches 28 in the plate 24 so as to permit the contents of the discharge tube to flow down into the chute 15. In this manner it will be seen that by oscillating the crank arm 21 the discharge tube will be alternately filled and discharged and only a limited amount of the substance permitted to flow down the chute for each operation.

It is to be understood that if so desired suitable stops 29 may be arranged on the cover between which the crank arm operates.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

A dispensing apparatus comprising, a reservoir, a discharge spout at the lower end of said reservoir, means holding the reservoir in elevated position, a plate at each end of the discharge spout, each plate having openings therein, the said openings being out of vertical alinement, coöperating plates associated with the first named plates, the coöperating plates having openings therein arranged out of vertical alinement, a shaft supporting the coöperating plates and means to rotate the shaft.

In witness whereof I affix my signature.

WLADYSLAW MALUSZ.